US009584504B2

(12) United States Patent
Wan et al.

(10) Patent No.: US 9,584,504 B2
(45) Date of Patent: Feb. 28, 2017

(54) AUTO LOGIN METHOD AND DEVICE

(71) Applicant: BEIJING QIHOO TECHNOLOGY COMPANY LIMITED, Beijing (CN)

(72) Inventors: Yong Wan, Beijing (CN); Xiquan Zeng, Beijing (CN); Sai Yang, Beijing (CN); Huan Ren, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 199 days.

(21) Appl. No.: 14/359,572

(22) PCT Filed: Nov. 20, 2012

(86) PCT No.: PCT/CN2012/084904
§ 371 (c)(1),
(2) Date: May 20, 2014

(87) PCT Pub. No.: WO2013/075612
PCT Pub. Date: May 30, 2013

(65) Prior Publication Data
US 2014/0344907 A1    Nov. 20, 2014

(30) Foreign Application Priority Data
Nov. 21, 2011    (CN) .......................... 2011 1 0371913

(51) Int. Cl.
*H04L 29/06*    (2006.01)
*G06F 21/31*    (2013.01)
(Continued)

(52) U.S. Cl.
CPC ........ *H04L 63/083* (2013.01); *G06F 17/2247* (2013.01); *G06F 17/30893* (2013.01);
(Continued)

(58) Field of Classification Search
CPC ............... G06F 17/30893; G06F 21/45; G06F 17/2247; H04L 63/168; H04L 63/083; G06Q 10/10
See application file for complete search history.

(56) References Cited

U.S. PATENT DOCUMENTS

2004/0093562 A1*    5/2004    Diorio ............... G06F 17/30873
715/205

FOREIGN PATENT DOCUMENTS

| CN | 101008945 A | * | 8/2007 | |
| CN | 101872365 A | * | 10/2010 | ........... G06F 17/243 |
| CN | 102495855 A | | 6/2012 | |

OTHER PUBLICATIONS

Yong-Wu et al.; "Automatic Sign-On for Web Application Program"; Computer Knowledge and Technology; Dec. 2010; vol. 6 No. 35; p. 10051-10054; includes English abstract.
(Continued)

*Primary Examiner* — Jung Kim
*Assistant Examiner* — Tri Tran
(74) *Attorney, Agent, or Firm* — Baker & Hostetler LLP

(57) ABSTRACT

Disclosed are an auto login method and device. The method includes: when a request for auto logging into a designated account is received, acquiring the URL of the login page, a login password and an account address of the designated account from a pre-stored configuration file, and loading the login page according to the URL; acquiring a login menu in an HTML document corresponding to the login page, searching for a login password input box and an account address input box contained in the login menu, and determining content to be filled into the account address input box; writing the content to be filled into the account address input box into the account address input box, and writing the login password into the login password input box; and
(Continued)

submitting the login menu which is written with the account address content and the login password, and completing auto login.

16 Claims, 12 Drawing Sheets

(51) Int. Cl.
    *G06F 17/30*     (2006.01)
    *G06F 17/22*     (2006.01)
    *G06Q 10/10*     (2012.01)
    *G06F 21/45*     (2013.01)
(52) U.S. Cl.
    CPC ............. *G06F 21/45* (2013.01); *G06Q 10/10* (2013.01); *H04L 63/168* (2013.01)

(56) References Cited

OTHER PUBLICATIONS

International Patent Application No. PCT/CN2012/084904; International Search Report; dated Feb. 7, 2013; 2 pages.

\* cited by examiner

AUTO LOGIN METHOD AND DEVICE

CROSS-REFERENCE TO RELATED APPLICATIONS

This application is the National Stage of International Application No. PCT/CN2012/084904, filed Nov. 20, 2012, which claims the benefits of Chinese Patent Application No. 201110371913.0, filed Nov. 21, 2011, the disclosures of which are incorporated herein by reference in their entireties.

TECHNICAL FIELD

The present invention relates to computer technology field, and in particular to an auto login method, an auto login device, a computer program and a computer readable medium.

BACKGROUND ART

E-mail is a space for communicating electronic information on network provided for network clients by an electronic network post office. The E-mail has the function of storing, receiving and sending electronic information, and is an important tool for information communication on the internet. Through the E-mail, a user may receive and send a mail anytime and anywhere, which greatly facilitates lives of people.

One common mode of an E-mail service is an E-mail service in which a web is used as an interface, in the mode, a login page of the E-mail may be accessed by a web browser; data such as a username and a password may be filled in a login menu of the login page, submission buttons such as "Login" may be clicked to realize the login of the E-mail, and then the operations of receiving and sending a mail may be executed.

However, in the above login process, the user is required to input the username and password via a keyboard every time he or she logs in, and thus a lot of user's operations are required to complete the login. In order to save the user's operation, some web browsers provide the function of auto login of the E-mail, wherein once the user have pre-set his or her username and the corresponding password, an "Auto-login" button provided by the browser may be clicked directly to log in his or her E-mail, without having to open the login interface first and then fill the data such as username and password in the input box.

The following manner may be usually used when automatically logging in the E-mail in the prior art: first, a developer manually analyzes the login menu of the login page, submits menu data and target URL (Universal Resource Locator) which are required in the login request, and acquires a data format needed in the login; then the developer constructs a simulative login menu based on the analysis of above data, in which when the user clicks the "Auto-login" button, data such as a pre-stored username and password are filled into the simulative login menu and submitted to the target URL so as to complete the auto login of the E-mail.

However, the inventor of the present patent has found in the implementation of the invention that at least the following problems occur when using the above manner to realize the auto login of the E-mail: the login pages of almost each of E-mails are different, thus, it is required to re-analyze the login interface for every supported E-mail and construct a corresponding simulative login menu, thereby complicating the process of sorting data.

Therefore, the technical problem that is needed to be solved by the person skilled in the art currently is how to avoid the complicated process of sorting data during the auto login process for an account.

SUMMARY OF THE INVENTION

In view of the above problem, the present invention is proposed to provide an auto login method as well as a corresponding auto login system, a computer program and a computer readable medium to overcome the above problem or at least partially solve or relieve the above problem.

According to one aspect of the present invention, there is provided an auto login method, comprising:

when a request for auto login into a designated account is received, acquiring an account address, a login password of the designated account and a URL of a login page from a pre-stored configuration file, and loading the login page according to the URL;

acquiring a login menu in an HTML document corresponding to the login page;

searching for a login password input box and an account address input box contained in the login menu according to an attribute of each element in the login menu;

determining content to be filled into the account address input box;

writing the content to be filled into the account address input box into the account address input box, and writing the login password into the login password input box; and submitting the login menu which is written with account address content and the login password.

According to another aspect of the present invention, there is provided an auto login device, comprising:

a loading module, configured to acquire an account address, a login password of a designated account and a URL of a login page from a pre-stored configuration file when a request for auto login into the designated account is received, and load the login page according to the URL;

an acquiring module, configured to acquire a login menu in an HTML document corresponding to the login page;

an analyzing module, configured to search for a login password input box and an account address input box contained in the login menu according to an attribute of each element in the login menu;

a determining module, configured to determine content to be filled into the account address input box;

a writing module, configured to write the content to be filled into the account address input box into the account address input box, and write the login password into the login password input box; and a submitting module, configured to submit a login menu which is written with the account address content and the login password.

According to still another aspect of the present invention, there is provided a computer program, comprising computer readable codes, wherein when the computer readable codes are operated on a terminal device, the terminal device performs the above auto login method.

According to further another aspect of the present invention, there is provide a computer readable medium which stores the above computer program.

The advantageous effects of the present invention are as follows:

In the embodiments of the present invention, when there is a need of auto login, it may analyze elements on the login page to search for the account address input box and login password input box and further to know whether it is required to write a complete account address into the account address input box or merely write a username part of the account address, etc., then write the account address into the account address input box, write the login password into the login password input box and then submit the menu to realize an auto login. As it can be seen that, by using the embodiments of the present invention during the implement of the auto login, there is neither need for the developer to manually analyze the login page nor need to construct a simulative login menu, whereby saving the cumbersome process of sorting data.

In addition, since the elements in the page are analyzed after loading the login page, it is also possible to realize a normal login even if the login manner in the log page is changed, thereby avoiding the problem of backward incompatibility.

The above description is merely an overview of the technical solution of the present invention. In order to more clearly understand the technical solution of the present invention for implement them in accordance with the content of the description, and to make the foregoing and other objects, features and advantages of the present invention more apparent, detailed embodiments of the invention will be provided below.

BRIEF DESCRIPTION OF DRAWINGS

After reading the following detailed description of preferred embodiments, various advantages and benefits will become clear to an ordinary person skilled in the art. The drawings are merely for the purpose of illustrating the preferred embodiments, and should not be considered as limiting the present invention. Further, throughout the drawings, same components will be indicated by the same reference signs. In the drawings:

FIG. 1-A schematically shows a flowchart of the process of searching for the login password input box and the account address input box contained in the login menu in step S101 according to the embodiment of the auto login method of the present invention;

FIG. 1-B schematically shows a flowchart of the process of searching for the login password input box and the account address input box contained in the login menu in step S101 according to the embodiment of the auto login method of the present invention;

FIG. 1-C schematically shows a flowchart of the process of searching for an E-mail address input box in step S101 according to the embodiment of the auto login method of the present invention;

FIG. 1-D schematically shows a flowchart of the process of determining content to be filled into the account address input box in step S101 according to the embodiment of the auto login method of the present invention;

FIG. 1-E schematically shows a flowchart of the process of submitting the login menu which has been written with the account address content and the login password in step S101 according to the embodiment of the auto login method of the present invention;

FIG. 4-A schematically shows a block diagram of an analyzing module according to the embodiment of the auto login device of the present invention;

FIG. 4-B schematically shows a block diagram of a second searching module in the analyzing module as shown in FIG. 4-A;

FIG. 4-C schematically shows a block diagram of a determining module according to the embodiment of the auto login device in the present invention;

FIG. 4-D schematically shows a block diagram of a submitting module according to the embodiment of the auto login device in the present invention;

DETAILED DESCRIPTION OF EMBODIMENTS

The present invention will be further described in conjunction with the accompanying drawings and specific embodiments hereinafter.

First, it should be explained that the auto login method provided in the embodiments of the present invention may be applied but not limited to the following situations: the auto login of an E-mail account, the auto login of an account such as a blog and a micro blog, the auto login of an online shopping website and the like. For purpose of the convenient description, the auto login of an electronic E-mail account will be introduced as an example, and may be applied to other similar situations thereto as long as the "E-mail account" is changed to a corresponding account.

Figure 1:
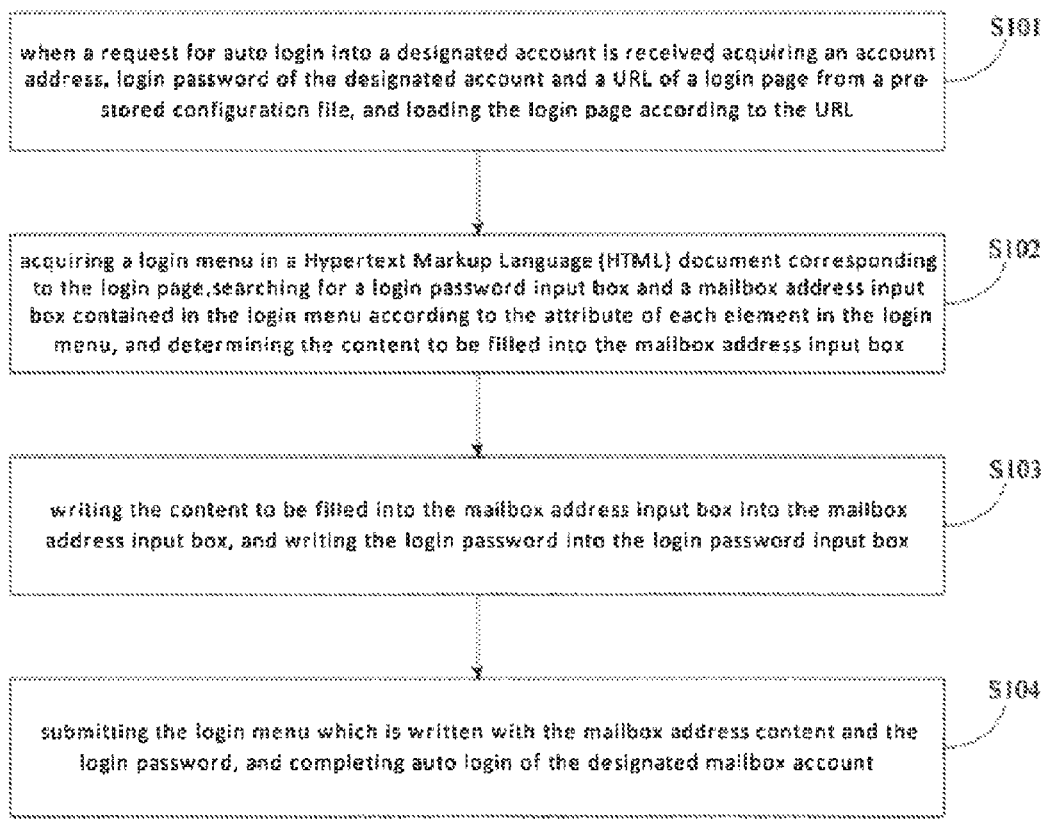
FIG. 1 schematically shows a step flowchart according to an embodiment of an auto login method of the present invention.
Figure 1A:
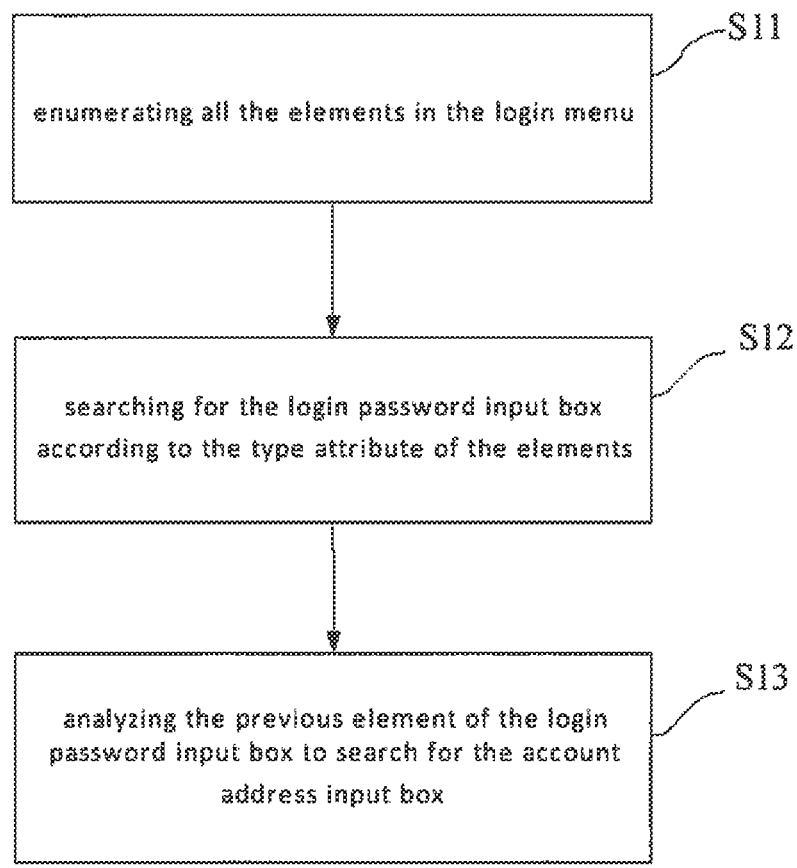
Figure 1B:
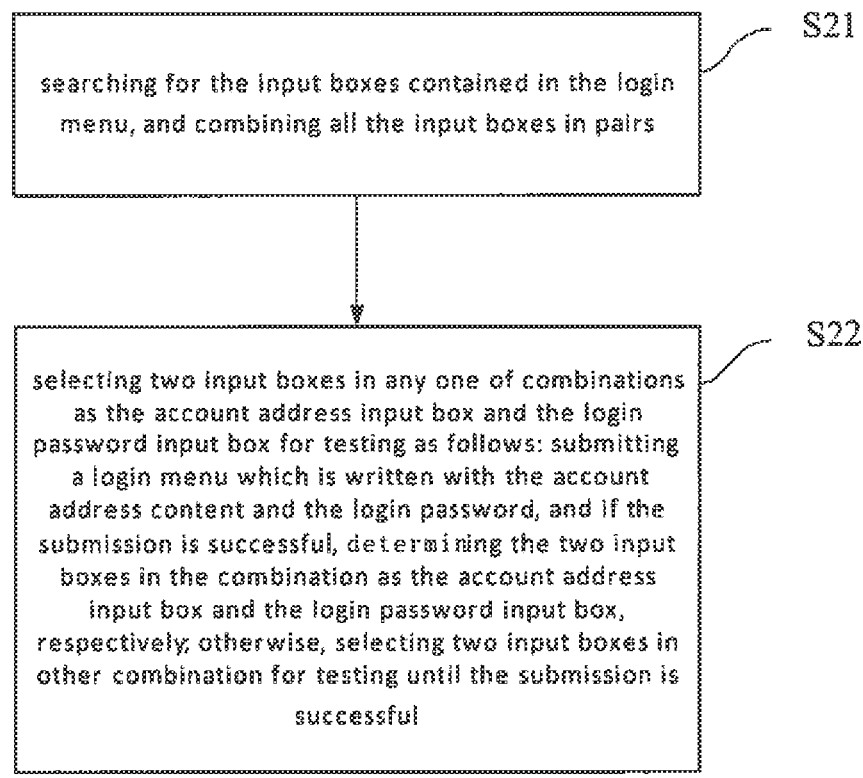
Figure 1C:
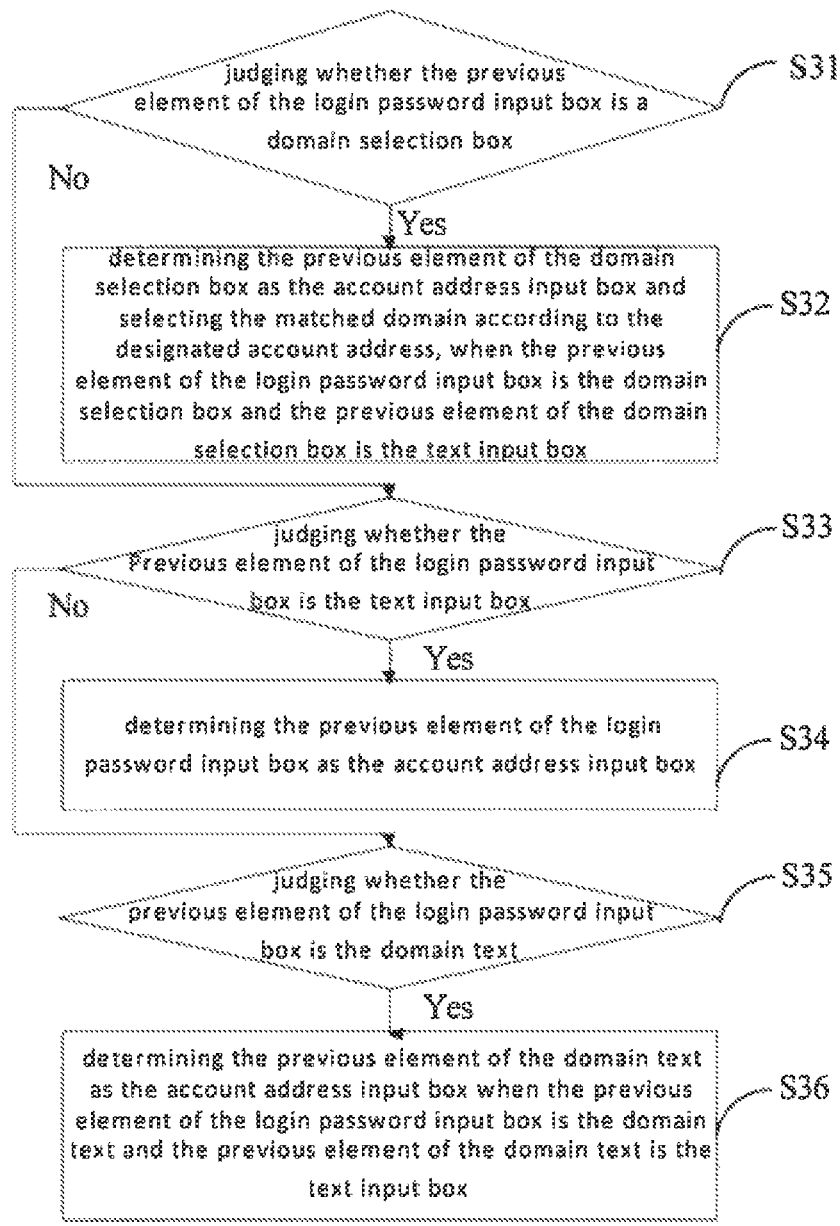
Figure 1D:
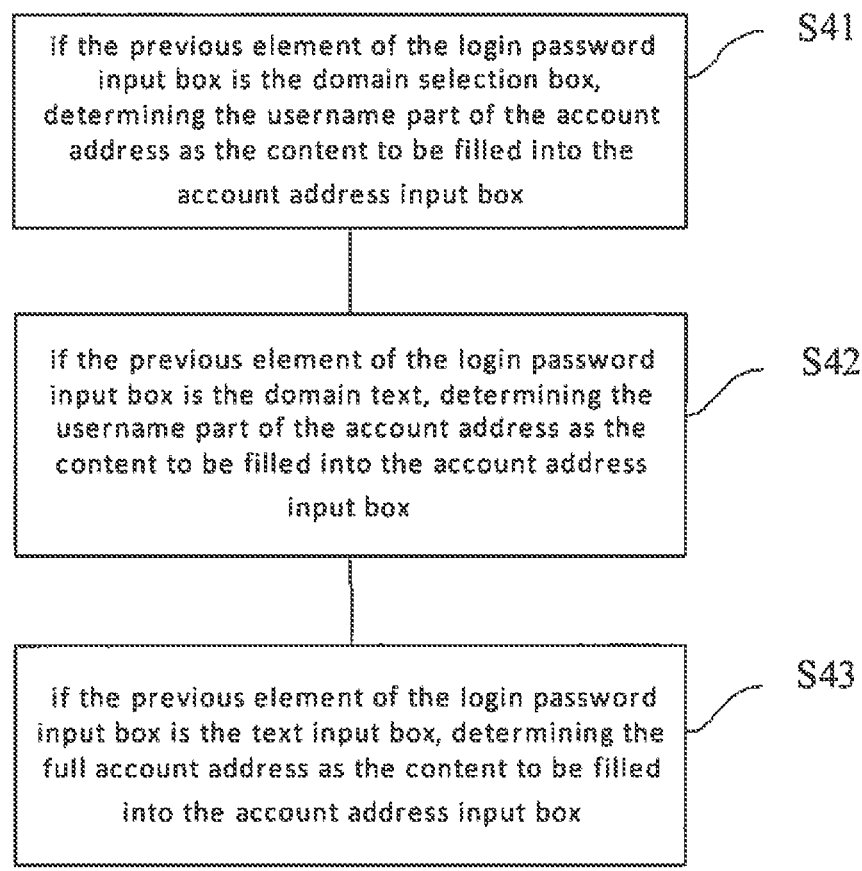
Figure 1E:
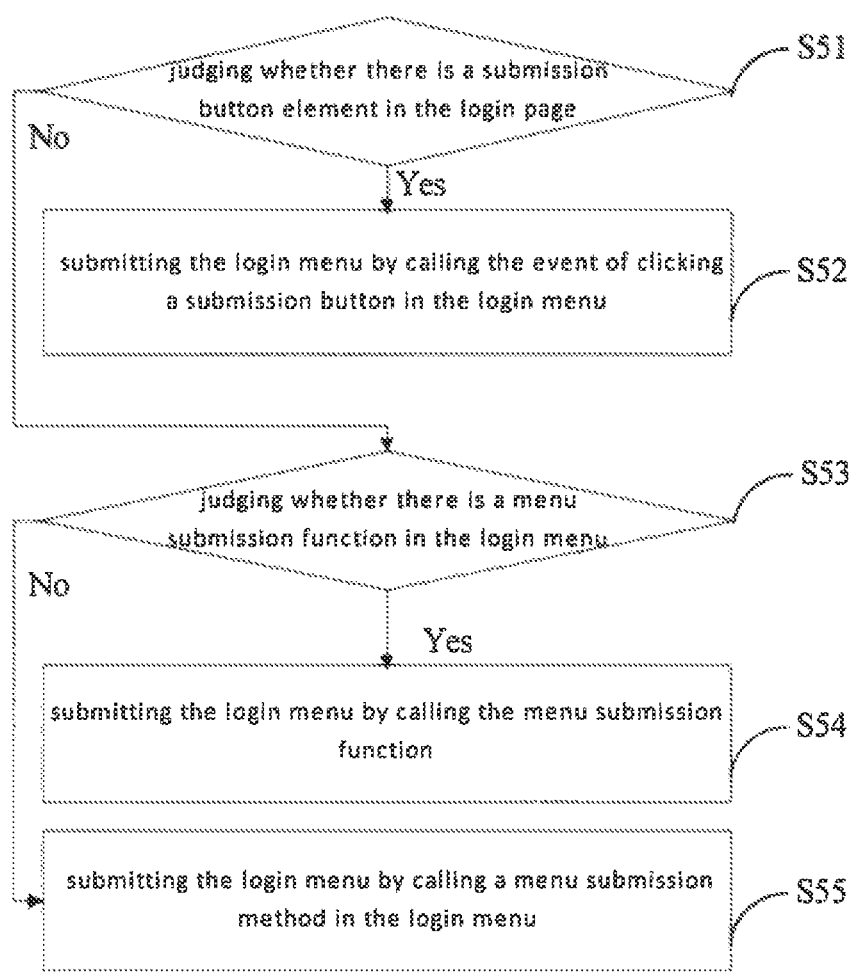

Referring to FIG. 1, it schematically shows a step flowchart according to an embodiment of an auto login method of the present invention. In the embodiment of the present invention, there is provided an auto login method of an electronic E-mail, which specifically includes the following steps:

S101: When a request for auto login into a designated E-mail account is received, acquiring an E-mail address, a login password of the designated E-mail account and a URL of a login page from a pre-stored configuration file, and loading the login page according to the URL;

It should be noted that, in order to use the method of the embodiments of the present invention to auto login into an E-mail, a user may click the button of "adding an mail reminder account" (as a matter of course, other typefaces are possible) once at the first time of setting, and add a personal E-mail account based on instructions; after a mail address and the login password are written, a browser may save the mail address, the login password and the URL of a corresponding login page in a configuration file. In practice, the number of added accounts is not limited, and the E-mail addresses of each E-mail account may be displayed in the browser's toolbar for example by way of a drop-down list.

When a user needs to login an E-mail account automatically, the user can click the drop-down list and then select to click a corresponding E-mail address. Accordingly, after the user clicks an E-mail address, it is equivalent for the browser to receive a request for auto login into the E-mail account, and then acquire the login password corresponding to the E-mail address and the URL of the login page from the configuration file to load the login page according to the URL.

S102: acquiring a login menu in a Hypertext Markup Language (HTML) document corresponding to the login page, searching for a login password input box and an E-mail address input box contained in the login menu according to an attribute of each element in the login menu, and determining content to be filled into the E-mail address input box;

To realize the login, the user's E-mail address and login password should be submitted in a certain format which is written in the login page. If the user directly writes the login password and the E-mail address in the corresponding location of the login page, such a submission in the format can be realized after clicking login. However, the object of the embodiment of the present invention is to realize auto login, that is, there is no need for the user to directly input the E-mail address and the login password into the designated location of the login page, the browser rather than the user realizes the process of writing the E-mail address and the login password. However, in the embodiment of the present invention, since a simulative login menu is not pre-constructed, the browser fails to directly know where the E-mail address and the login password should be written. Therefore, the embodiment of the invention uses a new manner to realize the correct writing of the E-mail address and the login password, that is, after the completion of loading the login page, it may be determined by analyzing the elements in the login page that how to write the E-mail address and the login password, so as to realize a correct submission and login.

In order to analyze elements in the login page, the embodiment of the present invention uses a manner of analyzing an HTML document corresponding to the login page. Herein, the HTML is a kind of markup language used to describe a webpage document, and the HTML document marks each part of a webpage to be displayed by mark symbols. That is, a webpage file itself is a text file that is used to tell the browser how to display the content therein (for example, how to process a text, how to arrange an image, and how to display a picture, etc.) by adding a tag to the text file. Then the browser reads the webpage file sequentially, interprets and displays the marked content according to the tag. Therefore, the login page of the E-mail also corresponds to the HTML document. The corresponding HTML document may be acquired after the completion of loading the login page, and it may be dependent on the corresponding HTML document that what the login page will display. For example, if an input box to which a user inputs an E-mail address is displayed in the login page, there must be a specific description about the input box in the HTML document, including the location where the input box is displayed, the displayed attribute (for example, the presence of a drop-down list) and so on. Therefore, the situation of the login page as a whole can be understood by analyzing the HTML document of the login page. On the other hand, since the HTML document is compiled in a certain criterion, there is provided a basis for machine analysis.

Figure 2:
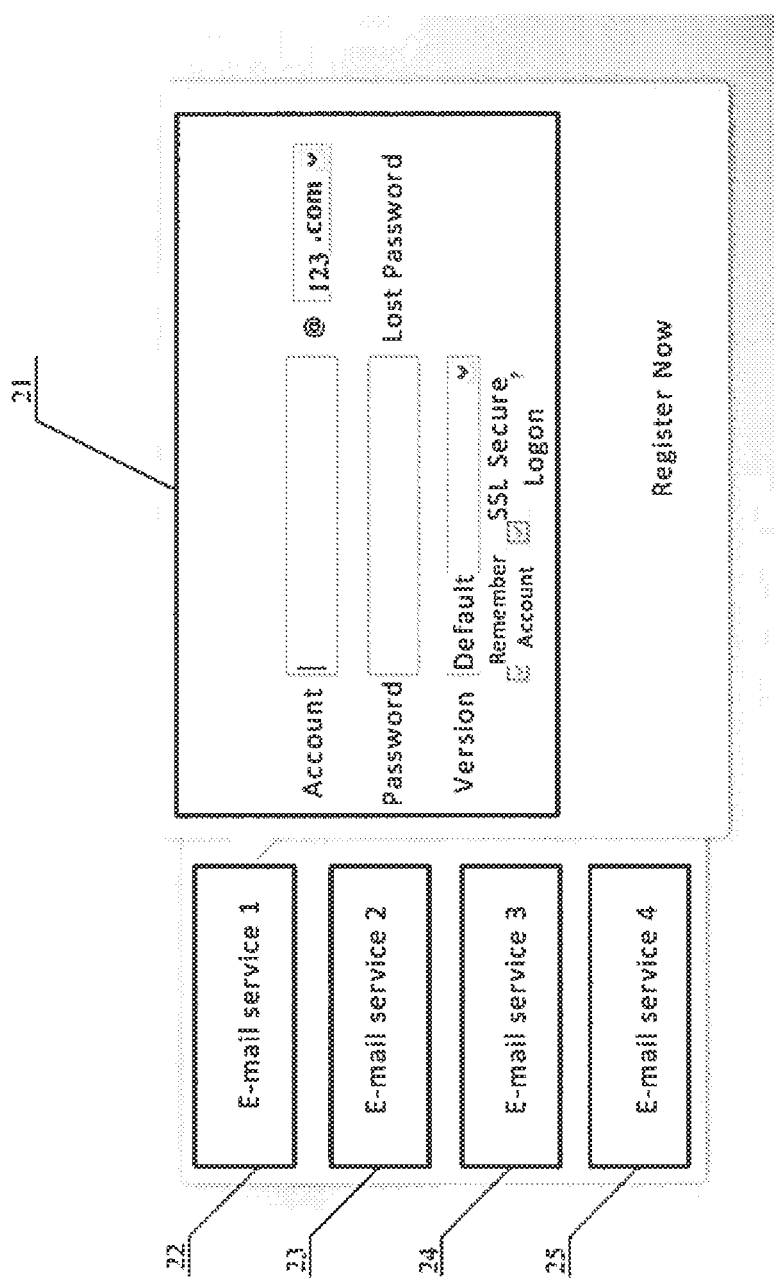
FIG. 2 schematically shows a diagram of an example of a login page according to the embodiment of an E-mail auto login method of the present invention.

During the analysis of the HTML document, the login menu contained therein may be found so as to analyze the attribute of each element in the login menu. For the purpose of better understanding, first, a simple introduction will be given to the concepts of the login menu and elements contained therein. Referring to FIG. 2, box 21 is shown as a login menu in the login page, wherein the typefaces such as "account" and "password", the input box for inputting a specific account following the "account" and the input box for inputting passwords following the "password", etc. are all elements in the login menu. Accordingly, the descriptions regarding the login menu and the attribute of each element therein may also be included in the HTML document corresponding to the login page. It should be explained that a login page may contain a plurality of login menus in practical application. For example, as shown in FIG. 2 again, an "E-mail service 1" shown in a box 22, an "E-mail service 2" shown in a box 23, an "E-mail service 3" shown in a box 24 and an "E-mail service 4" shown in a box 25 share the same login page but each of them corresponds to different login menus. Herein, the login menu in box 21 as shown in FIG. 2 is the login menu of the E-mail service 1, and when other E-mail service is switched to for example by clicking a mouse, it in turn may display the login menu corresponding to the switched E-mail service (not shown in FIG. 2). As for above situation, each login menu in the HTML document may be enumerated to specifically analyze each element in respective login menu.

By analyzing the attribute of each element in the login menu, the login password input box and the E-mail address input box may be found therefrom. The finding of the above two input boxes means that the browser has been informed of the places to be filled with the user's E-mail address and login password. It should be noted that a full E-mail address usually includes two parts, namely a username and a domain, and the two parts are partitioned by "@". In practical application, there may be the following situations: the content to be filled into the E-mail address input box may be various depending on the E-mail service providers. For example, the login menus of some E-mail services may provide the domain part of an E-mail address, and the user is merely required to write the username part of the E-mail address in the E-mail address input box; some login menus may provide a domain selection box in the form of a drop-down list, and in this case, the user is usually required to select the following domain and write the username part of the E-mail address in the E-mail address input box; and, some login menus may neither provide a default domain nor a domain selection box, and in this case, the user is required to input a full E-mail address in the E-mail address input box. Since there may be above various situations, it is not enough to merely determine the location of the E-mail address input box, but it is also necessary to determine the content to be entered in the E-mail address input box.

In order to search for the login password input box and the E-mail address input box contained in the login menu and determine the content to be filled into the E-mail address input box, various manners may be adopted. For example, one of the manner may consider that the login password input box usually has relatively special attribute (i.e., when the user inputs a login password therein, it will automatically display "•••" or "***", etc.) and the previous element of the login password input box is one of an E-mail address input box, a domain selection box and a domain text. For the latter two cases, the previous element of the domain selection box or a domain text is likely to be an E-mail address input box.

Specifically, referring to FIG. 1-A, the processing of searching for the login password input box and the account address input box contained in the login menu at step S101 may be realized by using the following flows:

Substep S11, enumerating all the elements in the login menu;

Substep S12, searching for the login password input box according to a type attribute of the elements; and Substep S13, analyzing a previous element of the login password input box and searching for the account address input box.

That is, in the present embodiment, it may enumerate all the elements in the login menu first, search for the login password input box according to the type attribute of the elements (for example, if the element is an input box, the attribute of an inputted character is: type=password), and then search for the E-mail address input box by analyzing the previous element of the login password input box.

As another preferred embodiment of the present invention, referring to FIG. 1-B, the processing of searching for the login password input box and the account address input box contained in the login menu may be realized by using the following flows:

Substep S21, searching for input boxes contained in the login menu, and combining all the input boxes in pairs; and Substep S22, selecting two input boxes in any one combination as the account address input box and the login password input box for testing as follows: submitting a login menu which is written with the account address content and the login password, and if the submission is successful, determining the two input boxes in the combination as the account address input box and the login password input box, respectively; otherwise, selecting two input boxes in other combination for testing until the submission is successful.

That is, in the present embodiment, it may search for all the input boxes contained in the login menu according to the attribute of each element in the login menu, combine these input boxes in pairs to input the E-mail address and the password in the two input boxes of each combination and attempt to submit the login menu, wherein if the submission fails, try other combination until the submission succeeds.

Specifically, referring to FIG. 1-C, the processing of searching for the E-mail address input box may be realized by using the following flows:

Substep S31, judging whether the previous element of the login password input box is a domain selection box; if so, going to Substep S32, and otherwise, going to Substep S33;

Substep S32, determining the previous element of the domain selection box as the account address input box and selecting the matched domain according to the designated account address, when the previous element of the login password input box is the domain selection box and the previous element of the domain selection box is the text input box;

Substep S33, judging whether the previous element of the login password input box is the text input box when the previous element of the login password input box is not the domain selection box, and if so, going to Substep S34, and otherwise, going to Substep S35;

Substep S34, determining the previous element of the login password input box as the account address input box when the previous element of the login password input box is the text input box;

Substep S35, judging whether the previous element of the login password input box is the domain text when the previous element of the login password input box is not the text input box, and if so, going to Substep S36; and Substep S36, determining the previous element of the domain text as the account address input box when the previous element of the login password input box is the domain text and the previous element of the domain text is the text input box.

Accordingly, referring to FIG. 1-D, the processing of determining the content to be filled into the account address input box at step S101 may be realized by using the following flows:

Substep S41, if the previous element of the login password input box is the domain selection box, determining the username part of the account address as the content to be filled into the account address input box;

Substep S42, if the previous element of the login password input box is the domain text, determining the username part of the account address as the content to be filled into the account address input box; and Substep S43, if the previous element of the login password input box is the text input box, determining the full account address as the content to be filled into the account address input box.

That is, in the present embodiment, it may be judged whether the previous element of the login password input box is the domain selection box first, and if so and the previous element of the domain selection box is the text input box, than the previous element of the domain selection box is determined as the E-mail address input box. Meanwhile, since there are a number of domains in the domain selection box and only one of the domains may be matched with the E-mail address designated by the user, the matched domain may be selected according to the E-mail address designated by the user at the same time. In addition, for this case, since the domain of the E-mail address has been selected in the domain selection box, the content to be filled into the E-mail address input box may be identified as the username part of the E-mail address.

If the previous element of the login password input box is not a domain selection box, it may be further judged whether the previous element of the login password input box is a text input box, and if so, the previous element of the login password input box may be directly determined as the login address input box, which is equivalent to neither a domain selection box nor a domain text is provided, and thus, a full E-mail address may be determined as the content to be written into the E-mail address input box; on the contrary, if the previous element of the login password input box is not a text input box, it may continue to judge whether the previous element of the login password input box is a domain text, and if so and the previous element of the domain text is a text input box, the previous element of the domain text may be determined as the login address input box. At this time, since the default domain text has been provided, the username part of the E-mail address may be determined as the content to be filled into the E-mail address input box.

It should be noted that the implementation of the above password input box, E-mail address input box and the determination of the content to be filled into the E-mail address input box is only one of various implementations. For example, in the case of first searching for the login password input box, when finding the E-mail address input box, the other implementation may first judge whether the previous element of the login password input box is a text input box or domain text, etc.; or, rather than first searching for the login password input box, it may first query the presence of the domain selection box or the domain text to submit the login menu and so on. Other specific implementations will no longer be described.

S103: writing the content to be filled into the E-mail address input box into the E-mail address input box, and writing the login password into the login password input box;

Since the E-mail address input box and the login password input box have been found and the content to be filled into the E-mail address input box has been determined, the content to be filled into the E-mail address input box may be written in the E-mail address input box and the login password may be written in the login password input box. This is equivalent to have the E-mail address and the login password filled in conformity with the provisions of login page format, which corresponds to the case when the user manually fills the E-mail address and the login password.

S104: submitting the login menu which is written with the E-mail address content and the login password, and completing auto login of the designated E-mail account.

Upon the completion of the writing operation at step S103, the login menu may be submitted to an E-mail server to wait for the server's response and complete the automatic login process. It should be noted that, in practice, if a situation such as that the E-mail address or the login password is input incorrectly exists, then the login page may jump to another page. In this case, if a previous E-mail address and password are still input, an infinite loop may occur. Therefore, in order to prevent the occurrence of this phenomenon, prior to the submission, the occurrence of jump before the current login page may be determined first. If a jump occurred before the login page, it is unnecessary to submit the E-mail address and the login password to the server. If a jump did not occur, then submit the login menu.

Herein, specifically in the submission of the login menu, there may be a variety of ways, for example, a submission button such as "login" is usually present in the login page. In this case, referring to FIG. 1-E, the processing of submitting a login menu written with the account address content and the login password at step S101 may be realized by using the following flows:

Substep S51, judging whether there is a submission button element in the login page; and if so, going to Substep S52, and otherwise, going to Substep S53;

Substep S52, submitting the login menu by calling the event of clicking the submission button in the login menu when there is a submission button element in the login page;

Substep S53, judging whether there is a menu submission function in the login menu when there is no submission button element in the login page, and if so, going to Substep S54, and otherwise, going to Substep S55;

Substep S54, submitting the login menu by calling the menu submission function when there is a menu submission function in the login menu; and Substep S55, submitting the login menu by calling a menu submission method in the login menu when there is no menu submission function in the login menu.

That is, in the present embodiment, it may be judged whether there is a submit button element in the login page first; and if so, submission is performed by calling the event of clicking a submission button in login menu; or otherwise, judge whether there is a submission function in the login menu, and if so, submission is performed by calling the submission function, or otherwise, submission is performed by calling submission method in login menu. In conclusion, if there is a submission button in the login page, trigger the submission flow as long as the event of clicking on the submission button in a simulative manner is required; if not, call the menu submission function provided by the E-mail service provider, and the menu submission function may further call menu submission method to submit; if there is even no menu submission function, submission is performed by directly calling the menu submission method provided by the E-mail service provider. The above method is of course not unique, for example, submission is performed by directly call the menu submission method without the previous determination, or directly judge whether there is a menu submission function without the determination of the presence of the submission button.

Figure 3:
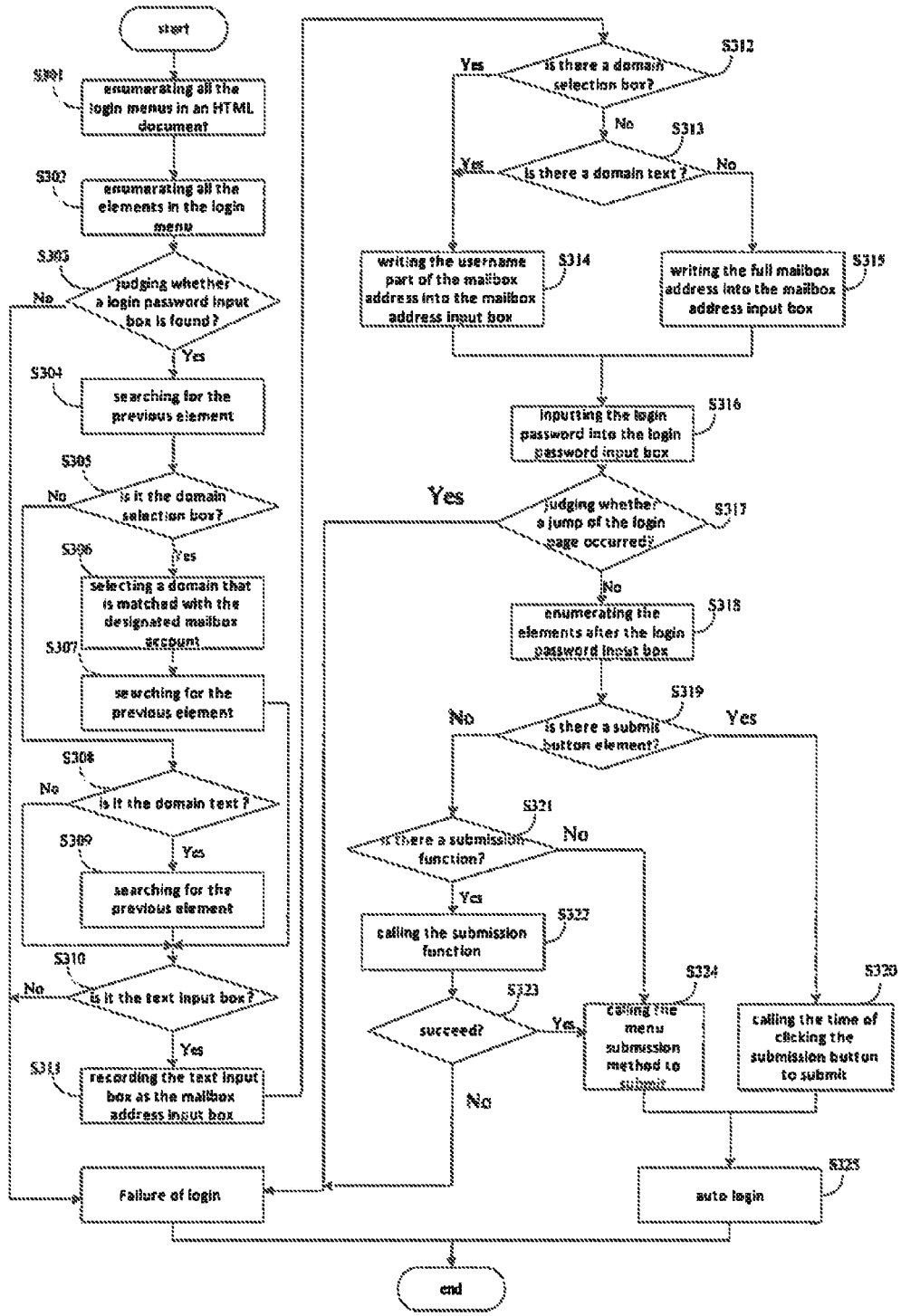
FIG. 3 schematically shows a flowchart specifically applied in a process of a certain E-mail login according to the embodiment of the auto login method of the present invention.

For a better understanding of an auto login method of the electronic E-mail provided in the embodiment of the present invention, a detailed introduction will be given below by way of a flowchart in a specific application. Referring to FIG. 3, it shows a flowchart of specifically applying the embodiment of the present invention to an E-mail login process, comprising the following steps:

S301: enumerating all login menus in an HTML document;

S302: enumerating all elements in a login menu;

S303: judging whether a login password input box is found; if so, going to step S304, or otherwise, the login fails;

S304: searching for a previous element of the password login input box;

S305: judging whether the previous element of the password login input box is a domain selection box; if so, going to step S306; otherwise, going to step S308;

S306: selecting a domain that is matched with the designated E-mail account;

S307: searching for a previous element of the domain selection box, and going to step S310;

S308: judging whether the previous element of the password login input box is a domain text (a regulation method may be used for judging); if so, going to step S309, or otherwise, going to step S310;

S309: searching for a previous element of the domain text, and going to step S310;

S310: judging whether it is the text input box; if so, going to step S311, otherwise, the login fails;

S311: recording the text input box as an E-mail address input box;

S312: judging whether there is a domain selection box between the E-mail address input box and the login password input box; if so, going to step S314, or otherwise, going to step S313;

S313: judging whether there is a domain text between the E-mail address input box and the login password input box; if so, going to step S314, otherwise, going to step S315;

S314: writing the username part of the E-mail address into the E-mail address input box, and going to step S316;

S315: writing the full E-mail address into the E-mail address input box, and going to step S316;

S316: inputting the login password into the login password input box;

S317: judging whether a jump of the login page occurred; if so, the login fails, otherwise, going to step S318;

S318: enumerating the elements after the login password input box in the login menu;

S319: determining whether there is a submit button element; if so, going to step S302, or otherwise, going to step S321;

S320: submission is performed by calling the time of clicking on the submission button;

S321: judging whether there is a menu submission function; if so, going to step S322, or otherwise, going to step S324;

S322: calling the menu submission function;

S323: judging whether the calling of the menu submission function succeeds, if so, going to step S324, or otherwise, the login fails;

S324: performing submission by calling the menu submission method;

S325: completing the auto login.

As it can be seen from the above steps, in the embodiment of the present invention, when there is a need of an auto login, a script may be run to analyze elements on the login page by the script, so as to search for the account address input box and the login password input box, and it may be known whether it is required to write a complete account address into the account address input box or merely write a username part of the account address, etc., then the account address is written into the account address input box, the login password is written into the login password input box and then the menu is submitted to realize an auto login. As it can be seen, during the process of realizing the auto login, there is neither need for the developer to manually analyze the login page nor need to construct a simulative login menu, whereby saving the cumbersome process of sorting data in the embodiment of the present invention. In addition, since the elements in the page are analyzed after the loading of the login page, it is also possible to realize a normal login even if the login manner in the log page is changed, thereby avoiding the problem of backward incompatibility.

It should be noted that, in order to simplify the description, the method embodiments may be described as combinations of a series of actions. However, a person skilled in the art should be aware that the present invention is not limited to the sequence of the described actions. According to the present invention, some of steps may employ other sequences or be performed simultaneously. Secondly, a person skilled in the art should also be aware that the embodiments described in the specification are all preferred embodiments, so the related actions and modules are not necessarily essential in the present invention.

Figure 4:
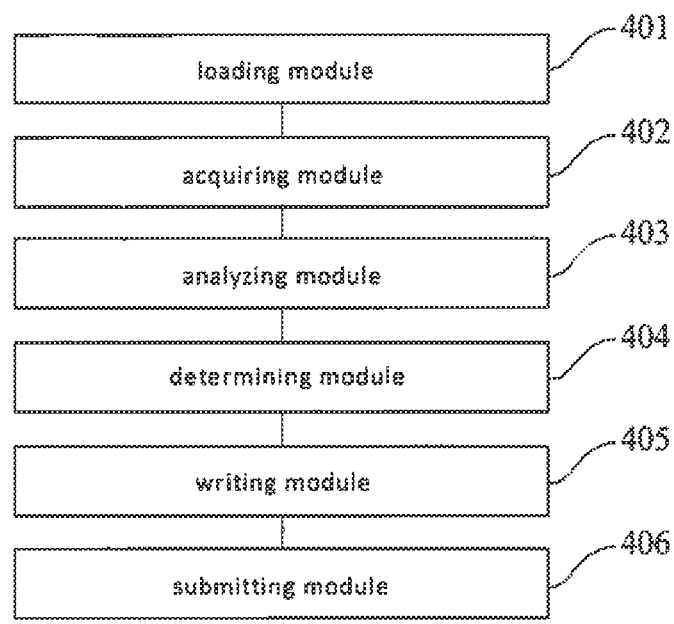
FIG. 4 schematically shows a block diagram according to an embodiment of an auto login device of the present invention.
Figure 4A:
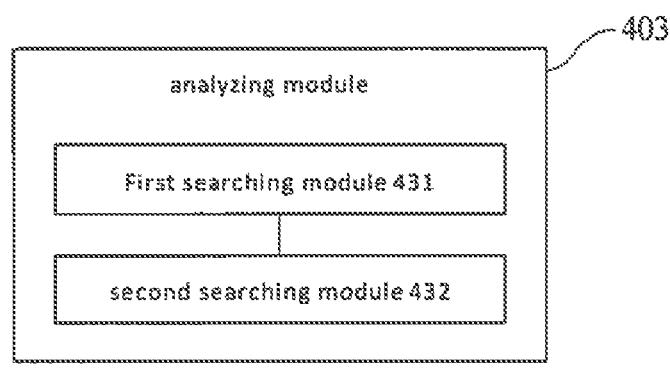
Figure 4B:
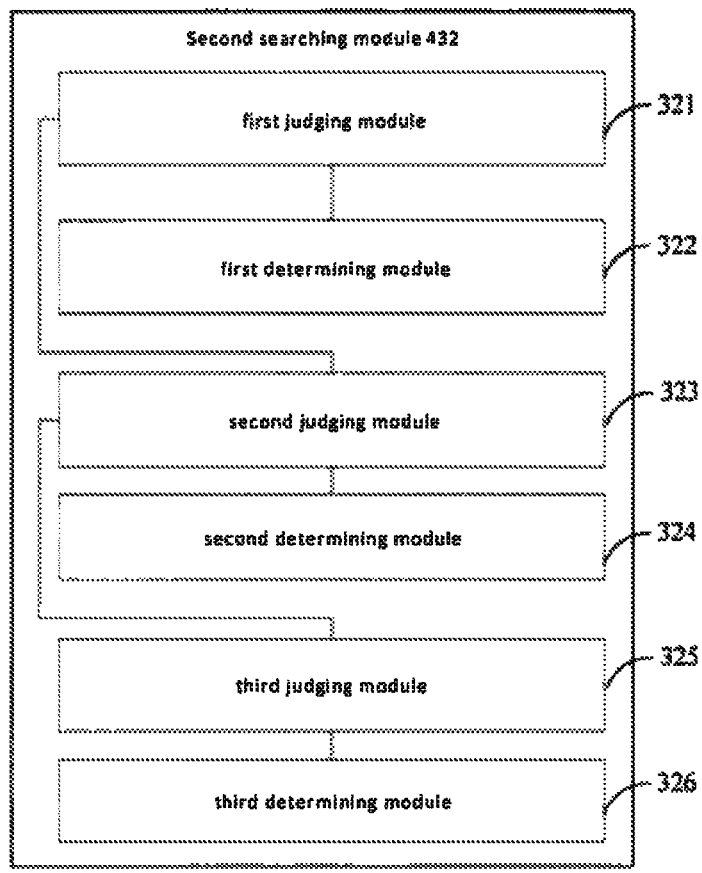
Figure 4C:
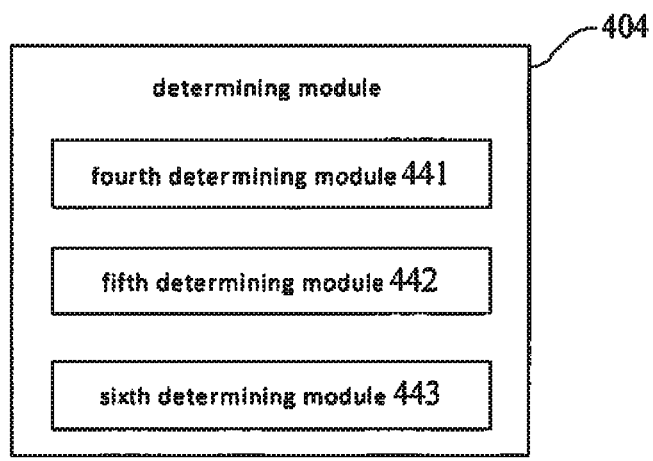
Figure 4D:
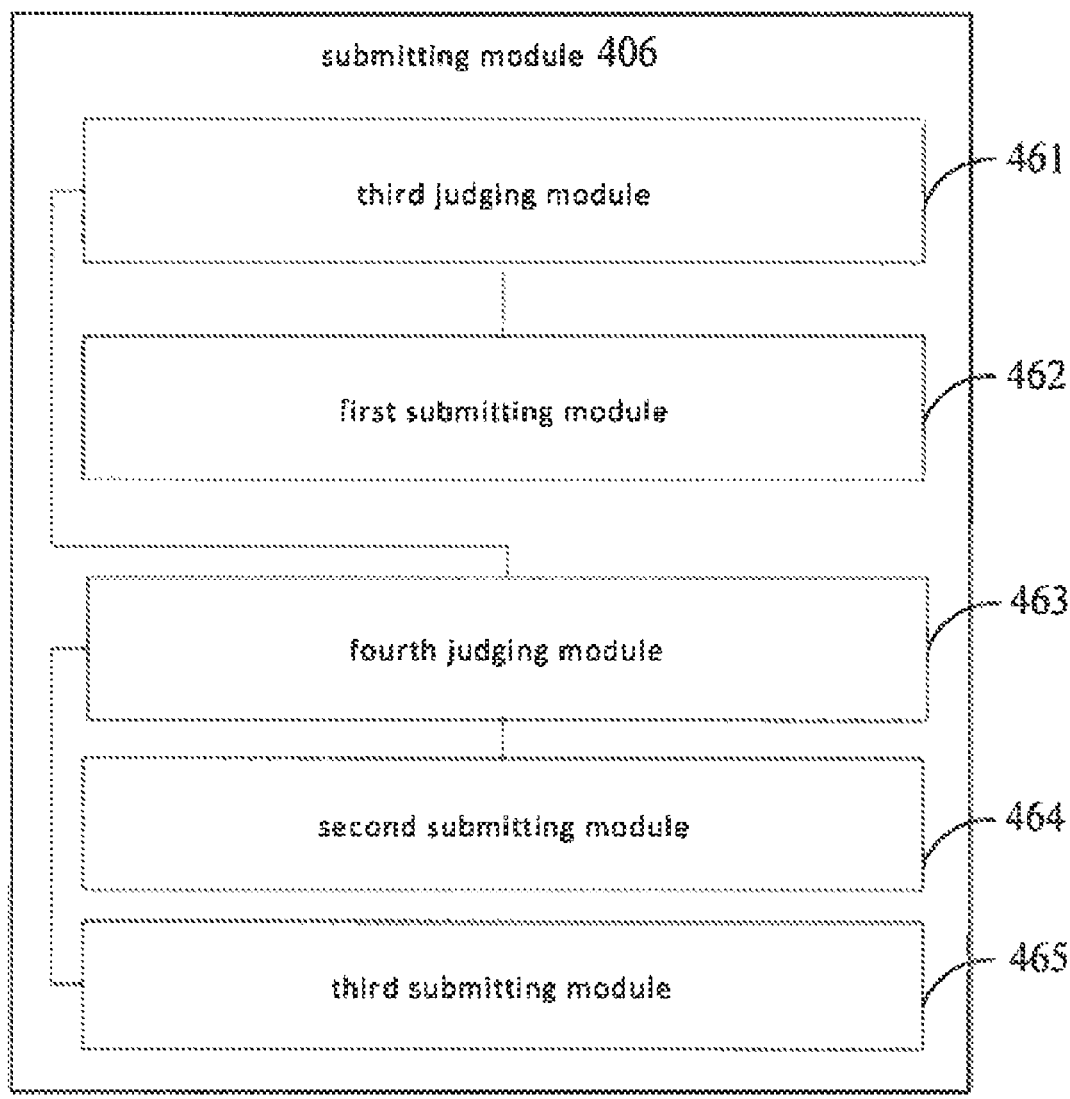

Corresponding to the auto login method provided in the embodiments of the present invention, a block diagram of an auto login device embodiment is also provided by an embodiment of the present invention. Referring to FIG. 4, the device may specifically include the following modules:

a loading module 401, configured to acquire an account address, a login password of the designated account and a URL of a login page from a pre-stored configuration file when a request for auto login into the designated account is received, and load the login page according to the URL;

an acquiring module 402, configured to acquire a login menu in an HTML document corresponding to the login page;

an analyzing module 403, configured to search for a login password input box and an account address input box contained in the login menu according to an attribute of each element in the login menu;

a determining module 404, configured to determine content to be filled into the account address input box;

a writing module 405, configured to write the content to be filled into the account address input box into the account address input box, and write the login password into the login password input box; and a submitting module 406, configured to submit a login menu which is written with the account address content and the login password.

Referring to FIG. 4-A, in a preferred embodiment of the present invention, the analyzing module 403 may include the following modules:

a first searching module 431, configured to enumerate all the elements in the login menu, and search for the login password input box according to a type attribute of the elements; and a second searching module 432, configured to analyze the previous element of the login password input box, and search for the account address input box.

Referring to FIG. 4-B, when the account address consists of a username part and a domain part, the second searching module 432 may further include the following modules:

a first judging module 321, configured to judge whether the previous element of the login password input box is a domain selection box; if so, call a first determining module 322, or otherwise, call a second judging module 323;

the first determining module 322, configured to determine the previous element of the domain selection box as the account address input box and select a matched domain according to the designated account address when the previous element of the login password input box is a domain selection box and the previous element of the domain selection box is a text input box;

the second judging module 323, configured to judge whether the previous element of the login password input box is a text input box when the previous element of the login password input box is not a domain selection box, and if so, call a second determining module 324, or otherwise, call a third judging module 325;

the second determining module 324, configured to determine the previous element of the login password input box as the account address input box;

the third judging module 325, configured to judge whether the previous element of the login password input box is a domain text, and if so, call a third determining module 326; and the third determining module 326, configured to determine the previous element of the domain text as the account address input box, when the previous element of the login password input box is the domain text and the previous element of the domain text is a text input box.

Accordingly, referring to FIG. 4-C, the determining module 404 may specifically include the following modules:

a fourth determining module 441, configured to determine a username part of the account address as the content to be filled into the account address input box when the previous element of the login password input box is a domain selection box;

a fifth determining module 442, configured to determine a username part of the account address as the content to be filled into the account address input box when the previous element of the login password is a domain text; and a sixth determining module 443, configured to determine a full account address as the content to be filled into the account address input box when the previous element of the login password input box is a text input box.

Of course, in other implementations, the analyzing module 403 may also include the following modules:

an input box searching module, configured to search for input boxes contained in the login menu and combine all the input boxes in pairs; and a testing module, configured to select two input boxes in any one of combinations as the account address input box and the login password input box for testing as follows: submitting a login menu which is written with the account address content and the login password, and if the submission is successful, determining the two input boxes in the combination as the account address input box and the login password input box, respectively; otherwise, selecting two input boxes in other combinations for testing until the submission is successful.

In order to avoid the occurrence of an infinite loop, the device may also include:

a jump judging module, configured to be connected with the submitting module and configured to judge whether a jump occurred in the login page, if not occurred, call the submitting module.

Referring to FIG. 4-D, in the specific implementation, the submitting module 406 may include the following modules:

a third judging module 461, configured to judge whether there is a submission button element in the login page; if so, call a first submitting module 462, or otherwise, call a fourth judging module 463;

the first submitting module 462, configured to submit the login menu by calling an event of clicking on a submission button in the login menu when the submission button element is in the login page;

the fourth judging module 463, configured to judge whether there is a menu submission function in the login menu when there is no submission button element in the login page, and if so, call a second submitting module 464, and otherwise, call a third submitting module 465;

the second submitting module 464, configured to submit the login menu by calling the menu submission function; and the third submitting module 465, configured to submit the login menu by calling a menu submission method in the login menu.

Since the device embodiment is substantially similar to the method embodiment, the description thereof is relatively simple and reference may be made to relevant description of the method embodiment.

The various members in the embodiments of the present invention can be implemented as hardware, or implemented as software modules operated on one or more processors, or implemented as the combination thereof. A person skilled in the art should understand that, in practice, a microprocessor or a digital signal processor (DSP) may be used to realize some or all of the functions of some or all of the members of the browser device according to the embodiments of the present invention. The present invention may further be implemented as equipments or device programs (for example, computer programs and computer program products) for executing some or all of the methods as described herein. The programs for implementing the present invention may be stored in the computer readable medium, or have a form of one or more signals. Such signals may be downloaded from the Internet websites, or be provided in a carrier, or be provided in other manners.

Figure 5:
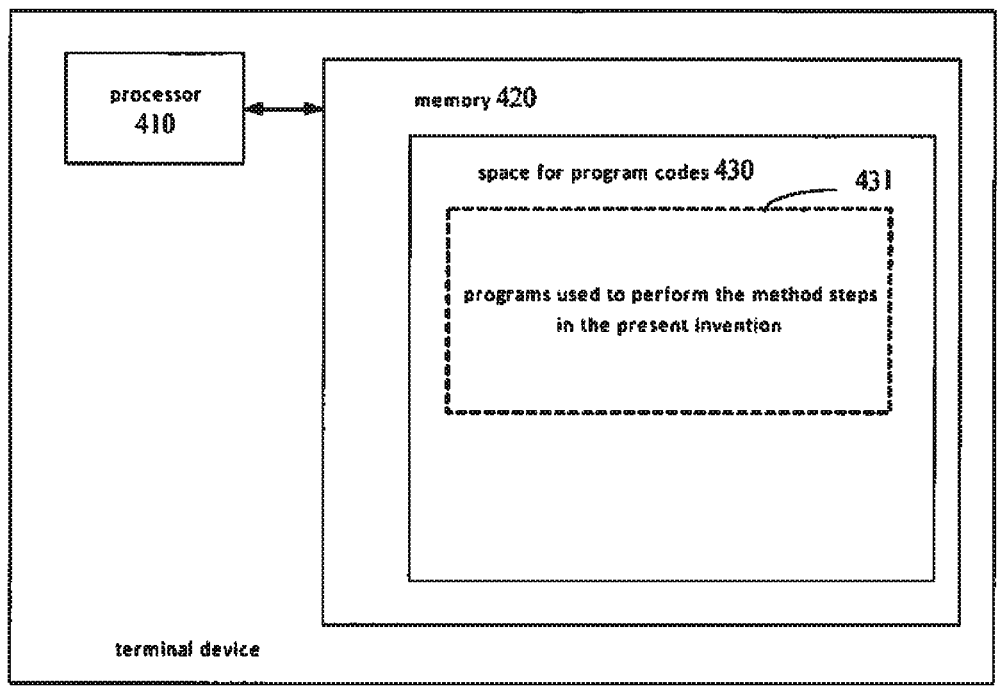
FIG. 5 schematically shows a block diagram of a terminal device for executing the auto login method according to the present invention.
Figure 6:
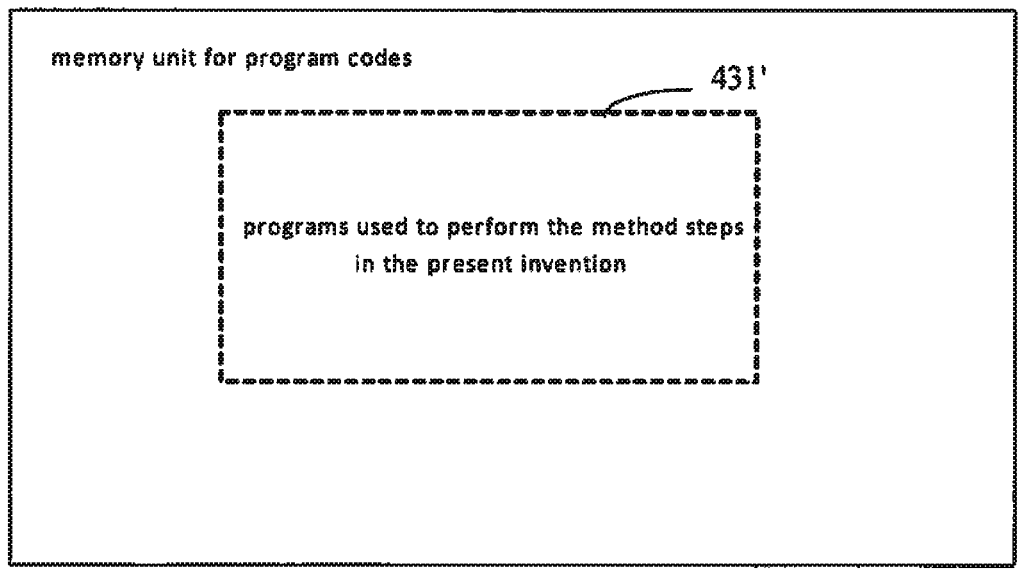
FIG. 6 schematically shows a storage unit used to hold or carry program codes for executing the auto login method according to the present invention.

For example, FIG. 5 schematically shows a terminal device that can implement the method of auto login according to the invention. Traditionally, the terminal device comprises a processor 410 and a computer program product or a computer readable medium in form of a memory 420. The memory 420 may be electronic memories such as flash memory, EEPROM (Electrically Erasable Programmable Read—Only Memory), EPROM, hard disk or ROM. The memory 420 has a memory space 430 for executing program codes 431 of any steps of the above methods. For example, the memory space 430 for program codes may comprise respective program codes 431 used to implement the various steps in the above mentioned method. These program codes may be read from and/or be written into one or more computer program products. These computer program products comprise program code carriers such as a hard disk, a compact disk (CD), a memory card or a floppy disk. These computer program products are usually the portable or stable memory unit as shown in reference FIG. 6. The memory unit may be provided with memory sections, memory spaces, etc., similar to the memory 420 of the server as shown in FIG. 5. The program codes may be compressed in an appropriate form. Usually, the memory cell includes computer readable codes 431' which can be read by processors such as 410. When these codes are operated on the terminal device, the terminal device may execute each step as described in the above method.

The terms "one embodiment", "an embodiment" or "one or more embodiment" used herein means that, the particular feature, structure, or characteristic described in connection with the embodiments may be included in at least one embodiment of the present invention. In addition, it should be noted that, for example, the wording "in one embodiment" used herein is not necessarily always referring to the same embodiment.

A number of specific details have been described in the specification provided herein. However, it is possible to be understood that the embodiments of present invention may be practiced without these specific details. In some examples, in order not to confuse the understanding of the specification, the known methods, structures and techniques are not shown in detail.

It should be noted that the above-described embodiments are intended to illustrate but not to limit the present invention, and alternative embodiments can be devised by the person skilled in the art without departing from the scope of claims as appended. In the claims, any reference symbols between brackets should not form a limit of the claims. The wording "comprising" does not exclude the presence of elements or steps not listed in a claim. The wording "a" or "an" in front of element does not exclude the presence of a plurality of such elements. The present invention may be achieved by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

Also, it should be noted that the language used in the present specification is chosen for the purpose of readability and teaching, rather than selected in order to explain or define the subject matter of the present invention. Therefore, it is obvious for an ordinary skilled person in the art that modifications and variations could be made without departing from the scope and spirit of the claims as appended. For the scope of the present invention, the disclosure of present invention is illustrative but not restrictive, and the scope of the present invention is defined by the appended claims.

The invention claimed is:

1. An auto login method, comprising:
   when a request for auto login into a designated account is received, acquiring an account address, a login password of the designated account and a Uniform Resource Locator (URL) of a login page from a pre-stored configuration file, and loading the login page according to the URL;
   acquiring a login menu in a Hypertext Markup Language (HTML) document corresponding to the login page;
   enumerating all elements in the login menu;
   searching for a login password input box and an account address input box contained in the login menu according to an attribute of each element in the login menu;

analyzing a previous element of the login password input box and searching for the account address input box, wherein the analyzing a previous element of the login password input box and searching for the account address input box further comprises:
  determining whether the previous element of the login password input box is a domain selection box,
  when the previous element of the login password input box is the domain selection box and a previous element of the domain selection box is a text input box, identifying the previous element of the domain selection box as the account address input box and selecting a matched domain according to the designated account address, and
  when the previous element of the login password input box is not the domain selection box, determining whether the previous element of the login password input box is the text input box, when the previous element of the login password input box is the text input box, identifying the previous element of the login password input box as the account address input box, when the previous element of the login password input box is not the text input box, determining whether the previous element of the login password input box is a domain text, when the previous element of the login password input box is the domain text and the previous element of the domain text is a text input box, identifying the previous element of the domain text as the account address input box;
  determining content to be filled into the account address input box;
  writing the content to be filled into the account address input box, and writing the login password into the login password input box; and
  submitting the login menu which is written with account address content and the login password.

2. The method according to claim 1, characterized in that, the step of determining content to be filled into the account address input box, comprises:
  when the previous element of the login password input box is a domain selection box, identifying a username part of the account address as the content to be filled into the account address input box;
  when the previous element of the login password input box is a domain text, determining the username part of the account address as the content to be filled into the account address input box; and
  when the previous element of the login password input box is a text input box, determining a full account address as the content to be filled into the account address input box.

3. The method according to claim 1, characterized in that the step of searching for a login password input box and an account address input box contained in the login menu according to an attribute of each element in the login menu, comprises:
  searching for input boxes contained in the login menu, and combining all the input boxes in pairs; and
  selecting two input boxes in any one of combinations as the account address input box and the login password input box for testing as follows: submitting a login menu which is written with the account address content and the login password, and if the submission is successful, determining the two input boxes in the combination as the account address input box and the login password input box, respectively; otherwise, selecting two input boxes in other combinations for testing until the submission is successful.

4. The method according to claim 1, characterized in that before the step of submitting the login menu which is written with the account address content and the login password, the method further comprises:
  determining whether a jump of the login page occurred, and if not, continuing the step of submitting the login menu which is written with the account address content and the login password.

5. The method according to claim 1, characterized in that the step of submitting the login menu which is written with the account address content and the login password, comprises:
  determining whether there is a submission button element in the login page;
  if there is a submission button element in the login page, submitting the login menu by calling an event of clicking on a submission button in the login menu; and
  when there is no submission button element in the login page, determining whether there is a menu submission function in the login menu, if there is a menu submission function in the login menu, submitting the login menu by calling the menu submission function, and if there is no menu submission function in the login menu, submitting the login menu by calling a menu submission method in the login menu.

6. The method according to claim 1, characterized in that the submitting the login menu which is written with the account address content and the login password, comprises:
  determining whether there is a submission button element in the login page;
  if there is a submission button element in the login page, submitting the login menu by calling an event of clicking on a submission button in the login menu; and
  if there is no submission button element in the login page, determining whether there is a menu submission function in the login menu, if there is a menu submission function in the login menu, submitting the login menu by calling the menu submission function, and if there is no menu submission function in the login menu, submitting the login menu by calling a menu submission method in the login menu.

7. The method according to claim 3, characterized in that the submitting the login menu which is written with the account address content and the login password, comprises:
  determining whether there is a submission button element in the login page;
  if there is a submission button element in the login page, submitting the login menu by calling an event of clicking on a submission button in the login menu; and
  if there is no submission button element in the login page, judging whether there is a menu submission function in the login menu, if there is a menu submission function in the login menu, submitting the login menu by calling the menu submission function, and if there is no menu submission function in the login menu, submitting the login menu by calling a menu submission method in the login menu.

8. The method according to claim 4, characterized in that the submitting the login menu which is written with the account address content and the login password, comprises:
  determining whether there is a submission button element in the login page;
  if there is a submission button element in the login page, submitting the login menu by calling an event of clicking on a submission button in the login menu; and if there is no submission button element in the login page, judging whether there is a menu submission function in the login menu, if there is a menu submission function in the login menu, submitting the login menu by calling the menu submission function, and if there is no menu submission function in the login menu, submitting the login menu by calling a menu submission method in the login menu.

9. An auto login device, comprising:
a processor;
a memory communicatively coupled to the processor and bearing instructions that upon execution by the processor cause the device at least to:
acquire an account address, a login password of a designated account and a Uniform Resource Locator (URL of a login page from a pre-stored configuration file when a request for auto login into the designated account is received, and load the login page according to the URL;
acquire a login menu in a Hypertext Markup Language (HTML) document corresponding to the login page;
enumerate all elements in the login menu;
search for a login password input box and an account address input box contained in the login menu according to an attribute of each element in the login menu;
analyze a previous element of the login password input box and search for the account address input box, wherein the instructions that cause the device to analyze a previous element of the login password input box and search for the account address input box further comprises instructions that upon execution by the processor cause the device to:
  determine whether the previous element of the login password input box is a domain selection box,
  identify the previous element of the domain selection box as the account address input box and select a matched domain according to the designated account address when the previous element of the login password input box is a domain selection box and a previous element of the domain selection box is a text input box,
  determine whether the previous element of the login password input box is a text input box when the previous element of the login password input box is not a domain selection box,
  in response to a determination that the previous element of the login password input box is a text input box, identify the previous element of the login password input box as the account address input box, and
  in response to a determination that the previous element of the login password input box is not a text input box, determine whether the previous element of the login password input box is a domain text, and if so, to identify the previous element of the domain text as the account address input box when the previous element of the login password input box is the domain text and the previous element of the domain text is a text input box;
determine content to be filled into the account address input box;
write the content to be filled into the account address input box into the account address input box, and write the login password into the login password input box; and
submit a login menu which is written with the account address content and the login password.

10. The device according to claim 9, wherein the memory further bears instructions that upon execution by the processor cause the device at least to:
  determine a username part of the account address as the content to be filled into the account address input box when the previous element of the login password input box is a domain selection box;
  determine a username part of the account address as the content to be filled into the account address input box when the previous element of the login password is a domain text; and
  determine a full account address as the content to be filled into the account address input box when the previous element of the login password input box is a text input box.

11. The device according to claim 9, wherein the memory further bears instructions that upon execution by the processor cause the device at least to:
  search for input boxes contained in the login menu and combine all the input boxes in pairs; and
  select two input boxes in any one combination as the account address input box and the login password input box for testing as follows: submitting a login menu which is written with the account address content and the login password, and if the submission is successful, determining the two input boxes in the combination as the account address input box and the login password input box, respectively; otherwise, selecting two input boxes in other combination for testing until the submission is successful.

12. The device according to claim 9, wherein the memory further bears instructions that upon execution by the processor cause the device at least to:
  determine whether a jump occurred in the login page.

13. The device according to claim 9, wherein the memory further bears instructions that upon execution by the processor cause the device at least to:
  determine whether there is a submission button element in the login page;
  submit the login menu by calling an event of clicking a submission button in the login menu when there is the submission button element in the login page;
  determine whether there is a menu submission function in the login menu when there is no submission button element in the login page;
  submit the login menu by calling the menu submission function in response to a determination that there is the menu submission function in the login menu; and
  submit the login menu by calling a menu submission method in the login menu in response to a determination that there is not the menu submission function in the login menu.

14. The device according to claim 9, wherein the memory further bears instructions that upon execution by the processor cause the device at least to:
  determine whether there is a submission button element in the login page;
  submit the login menu by calling an event of clicking a submission button in the login menu when there is the submission button element in the login page;
  determine whether there is a menu submission function in the login menu when there is no submission button element in the login page;
  submit the login menu by calling the menu submission function in response to a determination that there is the menu submission function in the login menu; and submit the login menu by calling a menu submission method in the login menu in response to a determination that there is not the menu submission function in the login menu.

15. The device according to claim 11, wherein the memory further bears instructions that upon execution by the processor cause the device at least to:
   determine whether there is a submission button element in the login page;
   submit the login menu by calling an event of clicking a submission button in the login menu when there is the submission button element in the login page;
   determine whether there is a menu submission function in the login menu when there is no submission button element in the login page;
   submit the login menu by calling the menu submission function in response to a determination that there is the menu submission function in the login menu; and
   submit the login menu by calling a menu submission method in the login menu in response to a determination that there is not the menu submission function in the login menu.

16. A non-transitory computer readable medium which stores computer program comprising computer readable codes, wherein when the computer readable codes are operated on a terminal device, the terminal device performs the following auto login method:
   when a request for auto login into a designated account is received, acquiring an account address, a login password of the designated account and a Uniform Resource Locator (URL) of a login page from a pre-stored configuration file, and loading the login page according to the URL;
   acquiring a login menu in a Hypertext Markup Language (HTML) document corresponding to the login page;
   enumerating all elements in the login menu;
   searching for a login password input box and an account address input box contained in the login menu according to an attribute of each element in the login menu;
   analyzing a previous element of the login password input box and searching for the account address input box, wherein the analyzing a previous element of the login password input box and searching for the account address input box further comprises:
      determining whether the previous element of the login password input box is a domain selection box,
      when the previous element of the login password input box is the domain selection box and a previous element of the domain selection box is a text input box, identifying the previous element of the domain selection box as the account address input box and selecting a matched domain according to the designated account address, and
      when the previous element of the login password input box is not the domain selection box, determining whether the previous element of the login password input box is the text input box, when the previous element of the login password input box is the text input box, identifying the previous element of the login password input box as the account address input box, when the previous element of the login password input box is not the text input box, determining whether the previous element of the login password input box is a domain text, when the previous element of the login password input box is the domain text and the previous element of the domain text is a text input box, identifying the previous element of the domain text as the account address input box;
   determining content to be filled into the account address input box;
   writing the content to be filled into the account address input box into the account address input box, and writing the login password into the login password input box; and
   submitting the login menu which is written with account address content and the login password.

* * * * *